United States Patent Office 2,987,522
Patented June 6, 1961

---

2,987,522
AMIDINE PRODUCTS
Kwan-Ting Shen, Brentwood, Mo., assignor to Petrolite Corporation, Wilmington, Del., a corporation of Delaware
No Drawing. Filed Mar. 17, 1958, Ser. No. 721,643
8 Claims. (Cl. 260—309.6)

This invention relates to compounds containing both a cyclic amidine ring and an alkylene ring containing a C=N group in the ring (the latter ring hereafter referred to as the "aza-alkylene ring"), said rings being joined to each other through the 1-position of the cyclic amidine ring and the carbon atom of the aza-alkylene ring which is attached through a double bond to the nitrogen atom of the aza-alkylene ring (hereafter called the "2-position of the aza-alkylene rings") by means of a single valence bond or an $(AX)_n$ radical, etc. where A is an alkylene radical and X comprises oxygen, amino or sulfur, and $n$ is a whole number, for example 1–10 or higher, but preferably 1. This invention also relates to process of using, for example, these compounds as corrosion inhibitors. These compounds are exemplified by the following formulae:

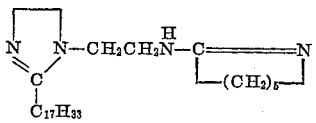

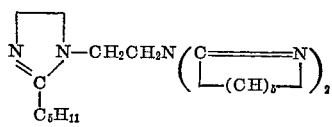

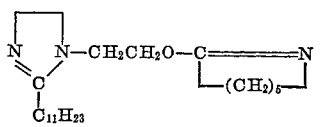

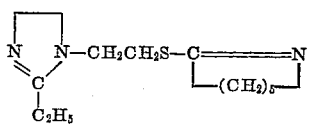

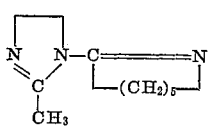

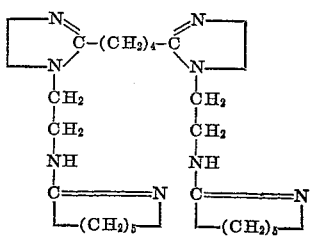

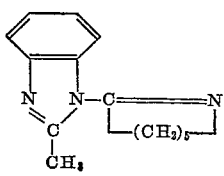

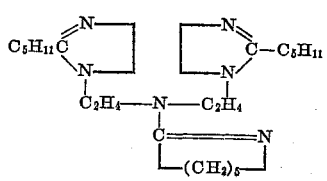

and the above compounds containing 6 member cyclic amidine rings such as

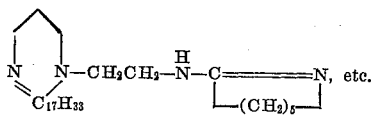

THE CYCLIC AMIDINE PRECURSOR

The expression "cyclic amidine" is employed in its usual sense to indicate ring compounds in which there are present either 5 or 6 members, and having 2 nitrogen atoms separated by a single carbon atom supplemented by either two additional carbon atoms or three additional carbon atoms in the main chain completing the ring. All the carbon atoms may be substituted. The nitrogen atom of the ring, involving two monovalent linkages (the 1-position) may be unsubstituted or substituted with a group containing at least one labile hydrogen capable of reacting with the aza-alkylene precursor, for example, an alkylene amine group, a polyalkylene amino group, an alkylene hydroxyl group, a polyoxyalkylene hydroxy group, an alkylenethiol group, a polythioalkylenethiol group, a polyalkylene group containing both sulfur and oxygen, nitrogen and oxygen, nitrogen, sulfur and oxygen, etc.

These cyclic amidines are further characterized as being substituted imidazolines and tetrahydropyrimidines in which the two-position carbon of the ring is generally bonded to a hydrocarbon radical or comparable radical derived from an acid, such as a low molal fatty acid, a high molal fatty acid, or comparable acids, aromatic acids, polycarboxy acids, acids containing heterocyclic rings, and the like.

For details of the preparation of imidazolines from amines, see the following U.S. patents, U.S. No. 1,999,-989, dated April 30, 1935, Max Bockmuhl et al.; U.S. No. 2,155,877, dated April 25, 1939, Edmund Waldmann et al.; and U.S. No. 2,155,878, dated April 25, 1939, Edmund Waldmann et al. Also see Chem. Rev. 32, 47 (43), and Chem. Rev. 54, 593 (54).

Equally suitable for use in preparing compounds useful in my invention and for the preparation of tetrahydropyrimidines substituted in the 2-position are the corresponding polyamines containing at least one primary amino group separated from the first primary amino group by three carbon atoms instead of being separated by only 2 carbons as with imidazolines. This reaction, as in the case of the imidazolines, is generally carried out by heating the reactants to a temperature at which 2 moles of water are evolved and ring closure is effected. For details of the preparation of tetrahydropyrimidines, see German Patent No. 700,371, dated December 18, 1940, to Edmund Waldmann and August Chwala; German Patent No. 701,322, dated January 14, 1941, to Karl Kiescher, Ernst Urech and Willi Klarer, and U.S. Patent No. 2,194,419, dated March 19, 1940, to August Chwala.

Substituted imidazolines and tetrahydropyrimidines are obtained from a variety of acids beginning with the one-carbon acid (formic) through and including higher fatty acids or the equivalent having 1–30 carbon atoms such as from 8–22 carbons. Modified fatty acids also can be employed as, for example, phenyl stearic acid or the like. Cyclic acids may be employed, including naphthenic acids. A varity of other acids, including benzoic acid, substituted benzoic acid, salicyclic acid, and the like, have been employed to furnish the residue

from the acid RCOOH in which the C of the residue

is part of the ring. The fatty acids employed, for example, may be saturated or unsaturated. They may be hydroxylated or nonhydroxylated. Branched long chain fatty acids may be employed. See J. Am. Chem. Soc. 74, 2523 (1952). This applies also to the lower molecular weight acids as well.

Among sources of such acids may be mentioned straight chain and branched chain, saturated and unsaturated, aliphatic cycloaliphatic, aromatic, hydroaromatic, aralkyl acids, etc.

Examples of saturated aliphatic monocarboxylic acids comprise: foamic, acetic, propionic, butyric, valeric, caproic, heptanoic, caprylic, nonanoic, capric, undecanoic, lauric, tridecanoic, myriatic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids comprise: acrylic, methacrylic, crotonic, anglic, teglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodencenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elaidic acid, the nonadecenoic acids, for example, the eisosenoic acids, the decosenoic acids, for example, erucic acid, brassidic acid, cetoleic acid, the tetracosenic acids, and the like.

Examples of dienoic acids comprise the pentadienoic acids, the hexadienoic acids, for example, sorbic acid, the octadienoic acids, for example, linoleic, and the like.

Examples of the trienoic acids comprise the octadecatrienoic acids, for example, linolenic acid, eleostearic acid, pseudo-eleostearic acid, and the like.

Carboxylic acids containing functional groups such as hydroxy groups can be employed. Hydroxy acids, particularly the alpha hydroxy acids comprise glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelaidic acid, hydroxyoctadecynoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxy acids comprise ricinoleyl lactic acid, acetyl ricinoleic acid, chloroacetyl ricinoleic acid, and the like.

Examples of the cyclic aliphatic carboxylic acids comprise those found in petroleum called naphthenic acids, hydnocarbic and chaulmoogric acids, cyclopentane carboxylic acids, cyclohexanecarboxylic acid, campholic acid, fencholic acids, and the like.

Examples of aromatic monocarboxylic acids comprise benzoic acid, substituted benzoic acids, for example, the toluic acids, the xyleneoic acids, alkoxy benzoic acid, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soya bean oil, peanut oil, caster oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; aralkyl and aromatic acids, such as Twitchell fatty acids, naphthoic acid, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids comprise those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids comprise fumaric, maleic, mesoconic, citraconic, glutonic, itaconic, muconic, acenitic acids, and the like.

Examples of aromatic polycarboxylic acids comprise phthalic, isophthalic acids, terephthalic acids, substituted derivatives thereof (e.g. alkyl, cholro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups comprise hemimellitic, trimellitic, trimesic, mellophanic, prehnitic, pyromellitic acids, mellitic acid, and the like.

Other polycarboxylic acids comprise the dimeric, trimeric and poly acids, for example, Emery Industries polymeric acids such as those described in U.S. Patent 2,763,612, and the like. Other polycarboxylic acids comprise those containing ether groups, for example, diglycollic acid. Mixtures of the above acids can be advantageously employed.

In addition, acid precursors such as esters, acid chlorides, glycerides, etc. can be employed in place of the free acid.

As is well known, cyclic amidines containing in the 1-position a group containing a labile hydrogen, capable of reacting with the aza-alkylene precursor, can be prepared by reacting a suitable amine with the desired carboxylic acid under cyclizing conditions, i.e., removal of 2 moles of water for each equivalent of carboxylate radical. Thus, where one employs a diamine such as ethylene or propylene diamine, a cyclic amidine which is unsubstituted in the 1-posiiton is obtained. This compound can be reacted with such compounds as alkylene oxides, alkylene sulfides, alkylene imines and the like to produce compounds of the formula

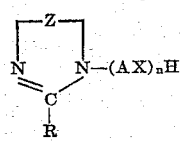

where Z is the alkylene residuum of the cyclic amidine ring, derived from the cyclic amidine forming polyamine, R is the group derived from the carboxylic acid, and A, X and $n$ have the meaning stated above for this side chain.

Alternatively amino and polyamino substituted cyclic amidine compounds can be prepared from polyamines such as a triamine or higher amines, for example, diethylene triamine, triethylene tetramine, tetraethylene pentamine, corresponding propylene analogues, etc. Thus, when one reacts diethylene triamine with a carboxylic acid, one obtains

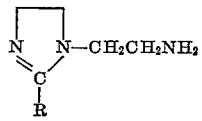

and with triethylene tetramine one obtains

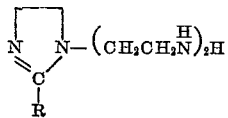

etc.

It should be noted that Z can also be part of an aromatic ring. Thus by reacting

with a carboxylic acid one obtains

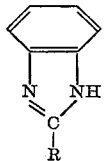

Hydroxy-substituted imidazolines and tetrahydropyrimidines can be obtained in the manner described above from a wide variety of polyamines containing hydroxy groups. Thus, where one starts with a polyamine, for example, a diamine of the following formula:

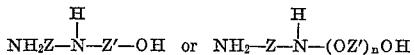

where Z and Z' have a 2 or 3 carbon chain in the main chain, one obtains the hydroxyalkylene compounds useful in this invention. In addition, one can start with ethylene diamine or with 1,2-propylene diamine, 1,3-propylene diamine or other polyamines and then react the cyclic amidine so obtained with alkylene oxides so as to produce a terminal hydroxy group since the nitrogen bonded hydrogen on the 1-position on the ring reacts with alkylene oxides. In addition, the hydroxyalkylene group can be oxyalkylated.

Alkylene oxides comprise those of the general formula,

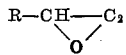

where R is a hydrogen or an alkyl group. Among the alkylene oxides that may be employed are ethylene, propylene, butylene, octylene, etc. oxides. Other oxyalkylation agents such as glycide, epichlorohydrin, styrene oxide, etc. can be employed.

Thiol-containing compounds are prepared in a manner analogous to that employed in preparing the hydroxy-substituted cyclic amidines, for example, by employing

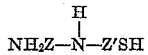

by employing alkylene sulfides, by replacing the oxygen atoms of the hydroxy alkylene oxides by employing sulfur replacing agents, etc.

Of course it will be realized that the above compounds containing sulfur, oxygen or nitrogen can be employed as well as any combinations of two of these elements within the same molecule, for example, cyclic amidines prepared from

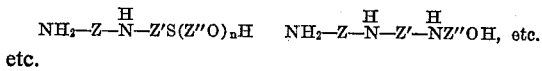

etc.

Thus, cyclic amidines within the scope of this invention which are reacted with aza-alkylenes comprise compounds of the formulae:

(1)

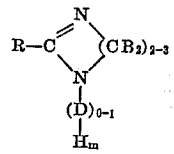

(2)

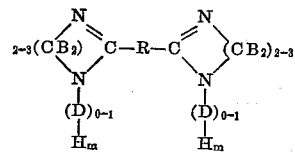

(3)

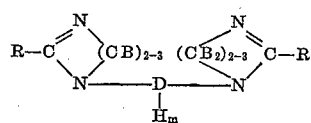

where

and $=C-R-C=$ are the residues derived from the carboxylic acid, monocarboxylic acids in (1) and (3), dicarboxylic acids in (2), where R comprises a hydrocarbon radical having, for example, 1–30 carbon atoms, hydrocarbons in which the carbon atom chain is inerrupted by oxygen, etc.; and B is a hydrogen or a hydrocarbon radical; D is a radical, for example $-(AX)_n-$ where X is amino, oxygen or sulfur and A is an alkylene radical containing, for example, 2–3 carbons in its main chain wherein $n$ is a whole number, for example, 1–10 or higher, but preferably 1, where $H_m$ indicates the presence of labile hydrogens wherein $m$ is a whole number equal to the replaceable hydrogens on the side chain, for example, 1–6, but preferably 1–3; and $(CB_2)_n$ is, for example, a divalent radical of the formulae:

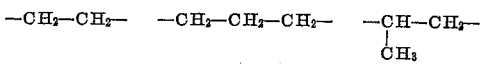

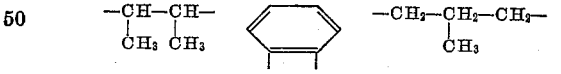

In (2) $CB_2$'s and the 1-substituted side chain may be the same or different.

Actually, substituted cyclic amidines can be obtained from a variety of polyamines, but only in the instance where one starts with a triamine or higher amine is there a residual group having a primary amino radical as herein required. This does not mean, however, that one could not start with ethylene diamine or with 1,2-propylene diamine. The cyclic amidines so obtained could be reacted with a mole of ethylene imine or propylene imine so as to introduce the terminal primary amino group. From a practical standpoint, however, the most readily available polyamines are ethylene diamine, diethylene triamine, triethylene tetramine, and tetraethylene pentamine. No particular advantage has been found in using other polyamines in which some other divalent radical, such as

appears. For this reason examples in Table I are limited to derivatives of the four most readily available polyamines above indicated.

Table I

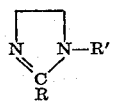

| Ex. No. | RCOOH Source of RC | R' |
|---|---|---|
| 1a | Lauric | $CH_2CH_2NH_2$ |
| 2a | Hexanoic | $CH_2CH_2NH_2$ |
| 3a | Isovaleric | $CH_2CH_2NH_2$ |
| 4a | Stearic | $CH_2CH_2NH_2$ |
| 5a | Melissic | $CH_2CH_2NH_2$ |
| 6a | Phenyl Stearic | $CH_2CH_2NH_2$ |
| 7a | Benzoic | $CH_2CH_2NH_2$ |
| 8a | Cresotinic | $CH_2CH_2NH_2$ |
| 9a | Naphthenic | $CH_2CH_2NH_2$ |
| 10a | Oleic | $CH_2CH_2NH_2$ |
| 11a | Oleic | $CH_2CH_2NHCH_2CH_2NH_2$ |
| 12a | Pelargonic | $CH_2CH_2NHCH_2CH_2NH_2$ |
| 13a | Lauric | $CH_2CH_2NHCH_2CH_2NH_2$ |
| 14a | Palmitic | $CH_2CH_2NHCH_2CH_2NH_2$ |
| 15a | Cerotic | $CH_2CH_2NHCH_2CH_2NH_2$ |
| 16a | p-tert-butyl benzoic | $CH_2CH_2NHCH_2CH_2NH_2$ |
| 17a | p-methoxy | $CH_2CH_2NHCH_2CH_2NH_2$ |
| 18a | Toluic | $CH_2CH_2NHCH_2CH_2NH_2$ |
| 19a | Naphthenic | $CH_2CH_2NHCH_2CH_2NH_2$ |
| 20a | p-hydroxy | $CH_2CH_2NHCH_2CH_2NH_2$ |
| 21a | Formic | $CH_2CH_2NHCH_2CH_2NHCH_2CH_2NH_2$ |
| 22a | Methyloctadecanoic | $CH_2CH_2NHCH_2CH_2NHCH_2CH_2NH_2$ |
| 23a | Capric | $CH_2CH_2NHCH_2CH_2NHCH_2CH_2NH_2$ |
| 24a | Stearic | $CH_2CH_2NHCH_2CH_2NHCH_2CH_2NH_2$ |
| 25a | Phenylstearic | $CH_2CH_2NHCH_2CH_2NHCH_2CH_2NH_2$ |
| 26a | Cresotinic | $CH_2CH_2NHCH_2CH_2NHCH_2CH_2NH_2$ |
| 27a | Linoleic | $CH_2CH_2NHCH_2CH_2NHCH_2CH_2NH_2$ |
| 28a | Oleic | $CH_2CH_2NHCH_2CH_2NHCH_2CH_2NH_2$ |
| 29a | 3-methoxybenzoic | $CH_2CH_2NHCH_2CH_2NHCH_2CH_2NH_2$ |
| 30a | Naphthenic | $CH_2CH_2NHCH_2CH_2NHCH_2CH_2NH_2$ |
| 31a | Lauric | $CH_2CH_2NHCH_2CH_2NHCH_2CH_2NH_2$ |
| 32a | Benzoic | $CH_2CH_2NHCH_2CH_2NHCH_2CH_2NH_2$ |

The only polyamines available on a large scale for the manufacture of tetrahydropyrimidines are propylene diamine and 3,3'-iminobispropylamine. This latter product can be converted into the tetramine or pentamine by appropriate reaction with a suitable imine or by reaction with acrylonitrile, followed by the usual steps of converting the intermediate into the amine. Tetrahydropyrimidines, comparable to the imidazolines of Table I appear in Table II, immediately following.

Table II

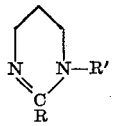

| Ex. No. | RCOOH Source of RC | R' |
|---|---|---|
| 1b | Formic | $CH_2CH_2CH_2NH_2$ |
| 2b | Acetic | $CH_2CH_2CH_2NH_2$ |
| 3b | Butyric | $CH_2CH_2CH_2NH_2$ |
| 4b | Valeric | $CH_2CH_2CH_2NH_2$ |
| 5b | Isovaleric | $CH_2CH_2CH_2NH_2$ |
| 6b | Phenyl Acetic | $CH_2CH_2CH_2NH_2$ |
| 7b | Pelargonic | $CH_2CH_2CH_2NH_2$ |
| 8b | Lauric | $CH_2CH_2CH_2NH_2$ |
| 9b | Stearic | $CH_2CH_2CH_2NH_2$ |
| 10b | Arachidic | $CH_2CH_2CH_2NH_2$ |
| 11b | Eicosane-carboxylic | $CH_2CH_2CH_2NH_2$ |
| 12b | Cerotic | $CH_2CH_2CH_2NH_2$ |
| 13b | Melissic | $CH_2CH_2CH_2NH_2$ |
| 14b | Phenyl Stearic | $CH_2CH_2CH_2NH_2$ |
| 15b | Benzoic | $CH_2CH_2CH_2NH_2$ |
| 16b | p-methoxy benzoic acid | $CH_2CH_2CH_2NH_2$ |
| 17b | Cresotinic | $CH_2CH_2CH_2NH_2$ |
| 18b | Salicylic | $CH_2CH_2CH_2NH_2$ |
| 19b | P-tert-Butylbenzoic | $CH_2CH_2CH_2NH_2$ |
| 20b | p-methoxy benzoic | $CH_2CH_2CH_2NH_2$ |
| 21b | Oleic | $CH_2CH_2CH_2NH_2$ |
| 22b | Undecylenic | $CH_2CH_2CH_2NH_2$ |
| 23b | Linoleic | $CH_2CH_2CH_2NH_2$ |
| 24b | Hydroxy Butyric | $CH_2CH_2CH_2NH_2$ |
| 25b | Methyloctadecanoic | $CH_2CH_2CH_2NH_2$ |
| 26b | Napthenic | $CH_2CH_2CH_2NH_2$ |
| 27b | Palmitic | $CH_2CH_2CH_2NH_2$ |

The procedure employed in the manufacture of suitable substituted imidazolines from dicarboxylic acids is comparable to that employed when monocarboxylic acids are used as reactants. Suitable amines derived from the three amines previously noted are described in Table III.

Table III

| Ex. No. | HOOC-R-COOH Source of —CRC— | R' |
|---|---|---|
| 1c | Succinic | $CH_2CH_2NH_2$ |
| 2c | Adipic | $CH_2CH_2NH_2$ |
| 3c | Suberic | $CH_2CH_2NH_2$ |
| 4c | Sebacic | $CH_2CH_2NH_2$ |
| 5c | Nonodecane dicarboxylic | $CH_2CH_2NH_2$ |
| 6c | Diglycolic | $CH_2CH_2NH_2$ |
| 7c | Ethylene Bis-(glycolic) | $CH_2CH_2NH_2$ |
| 8c | Methylene dibenzoic | $CH_2CN_2NH_2$ |
| 9c | Stearyl Malonic | $CH_2CH_2NH_2$ |
| 10c | Phthalic | $CH_2CH_2NH_2$ |
| 11c | Succinic | $CH_2CH_2NHCH_2CH_2NH_2$ |
| 12c | Glutaric | $CH_2CH_2NHCH_2CH_2NH_2$ |
| 13c | Pimelic | $CH_2CH_2NHCH_2CH_2NH_2$ |
| 14c | Azelaic | $CH_2CH_2NHCH_2CH_2NH_2$ |
| 15c | Eicosane dicarboxylic | $CH_2CH_2NHCH_2CH_2NH_2$ |
| 16c | Dilinoleic | $CH_2CH_2NHCH_2CH_2NH_2$ |
| 17c | Isophthalic | $CH_2CH_2NHCH_2CH_2NH_2$ |
| 18c | Diglycolic | $CH_2CH_2NHCH_2CH_2NH_2$ |
| 19c | Lauryl Malonic | $CH_2CH_2NHCH_2CH_2NH_2$ |
| 20c | Methylene dibenzoic | $CH_2CH_2NHCH_2CH_2NH_2$ |
| 21c | Adipic | $CH_2CH_2NHCH_2CH_2NHCH_2CH_2NH_2$ |
| 22c | Succinic | $CH_2CH_2NHCH_2CH_2NHCH_2CH_2NH_2$ |
| 23c | Suberic | $CH_2CH_2NHCH_2CH_2NHCH_2CH_2NH_2$ |
| 24c | Pimelic | $CH_2CH_2NHCH_2CH_2NHCH_2CH_2NH_2$ |
| 25c | Nonedecane dicarboxylic | $CH_2CH_2NHCH_2CH_2NHCH_2CH_2NH_2$ |
| 26c | Diglycolic | $CH_2CH_2NHCH_2CH_2NHCH_2CH_2NH_2$ |
| 27c | Methylene dibenzoic | $CH_2CH_2NHCH_2CH_2NHCH_2CH_2NH_2$ |
| 28c | Steryl malonic | $CH_2CH_2NHCH_2CH_2NHCH_2CH_2NH_2$ |
| 29c | Stearyl succinic | $CH_2CH_2NHCH_2CH_2NHCH_2CH_2NH_2$ |
| 30c | Terephthalic | $CH_2CH_2NHCH_2CH_2NHCH_2CH_2NH_2$ |
| 31c | Dilinoleic | $CH_2CH_2NHCH_2CH_2NHCH_2CH_2NH_2$ |
| 32c | Phthalic | $CH_2CH_2NHCH_2CH_2NHCH_2CH_2NH_2$ |

In the use of dicarboxy acid, the bulk of the examples were obtained from 3,3'-iminobispropylamine. These compounds which appear in Table IV are comparable to those which appeared in Table III preceding.

Table IV

| Ex. No. | HOOC—R—COOH Source of —CRC— | R' |
|---|---|---|
| 1d | Alkenylsuccinic | $CH_2CH_2CH_2NH_2$ |
| 2d | Succinic | $CH_2CH_2CH_2NH_2$ |
| 3d | Glutaric | $CH_2CH_2CH_2NH_2$ |
| 4d | Adipic | $CH_2CH_2CH_2NH_2$ |
| 5d | Suberic | $CH_2CH_2CH_2NH_2$ |
| 6d | Sebacic | $CH_2CH_2CH_2NH_2$ |
| 7d | Pimelic | $CH_2CH_2CH_2NH_2$ |
| 8d | Azelaic | $CH_2CH_2CH_2NH_2$ |
| 9d | Nonodecane dicarboxylic | $CH_2CH_2CH_2NH_2$ |
| 10d | Eicosane dicarboxylic | $CH_2CH_2CH_2NH_2$ |
| 11d | Diglycolic | $CH_2CH_2CH_2NH_2$ |
| 12d | Ethylene bisglycolic | $CH_2CH_2CH_2NH_2$ |
| 13d | Methylene disalicylic | $CH_2CH_2CH_2NH_2$ |
| 14d | Dilinoleic | $CH_2CH_2CH_2NH_2$ |
| 15d | Stearyl malonic | $CH_2CH_2CH_2NH_2$ |
| 16d | Lauryl succinic | $CH_2CH_2CH_2NH_2$ |
| 17d | Isotetradecyl succinic | $CH_2CH_2CH_2NH_2$ |
| 18d | Phthalic | $CH_2CH_2CH_2NH_2$ |
| 19d | Isophthalic | $CH_2CH_2CH_2NH_2$ |
| 20d | Terephthalic | $CH_2CH_2CH_2NH_2$ |
| 21d | Phenyl acetic | $CH_2CH_2CH_2NH_2$ |
| 22d | Maleic | $CH_2CH_2CH_2NH_2$ |

In addition, one can employ hydroxy compounds as the amidine precursor, for example, cyclic amidines shown in the above tables wherein R' is $-(CH_2CH_2O)_nH$ where $n$ is 1–10, but preferably 1. Thus, R' may be $-CH_2CH_2OH$, $-(CH_2CH_2O)_2H$, $-(CH_2CH_2O)_3H$, etc.

In addition, the —CH₂CH₂— group may be a higher homologue, for example, propylene, butylene, etc.

Furthermore, R' can also be —(CH₂CH₂S)ₙH where $n$ is 1–10, but preferably 1, forming a compound analogous to the above oxygen compounds. Additionally, R' can be a group containing —(CHCH₂X)ₙH where X may be —NH—, —O—, —S—, and all three, two, or one of these elements can be present in the R' grouping, for example, where R' is

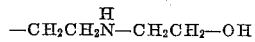

—CH₂CH₂—S—CH₂CH₂OH,
—CH₂CH₂SCH₂CH₂OCH₂CH₂NH₂
and the like.

THE AZA-ALKYLENE PRECURSOR

The aza-alkylene precursors are O-organoalkylene lactims and are in essence O-organo derivatives of enolic lactams, for example O-alkyl derivatives, e.g. the O-methyl, O-ethyl, etc. derivatives of alkylene lactams, such as lactams containing, for example, 5–8 member rings such as butyrolactam, valerolactam, caprolactam, heptylolactam. They may be described by the following formula:

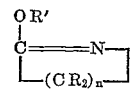

where R' is alkyl and R is hydrogen, alkyl, etc. or another radical containing groups that do not enter into or interfere with the reaction of the cyclic amidine with the aza-alkylenes, $n=3-6$.

Further discussion of the preparation of O-organo-alkylene lactims is unnecessary since their preparation is well known, having been described in Benson and Canns, J.A.C.S. 70, 2115–18 (1948); Schlack, U.S. 2,356,622; Knoll A.-G. French Patent 673,628; Schmidt and Zutavein, German Patent 539,969, and elsewhere. The preferable class is the O-lower alkyl lactims, most preferably ethyl or methyl. The preferable species is the O-methyl γ-caprolactim.

THE CYCLIC AMIDINE-LACTIM REACTION PRODUCT

In general, the product is prepared by reacting a cyclic amidine with an alkoxylactim until the theoretical amount of alkanol is removed, for example, by distillation or other suitable means or until no more alcohol distills over. There should be present in the reaction mixture at least a chemical equivalent of lactim for each equivalent of labile hydrogen present in the cyclic amidine. In instances where the cyclic amidine contains two or more labile hydrogens and it is desirable to replace only one of them, one should employ not more than one equivalent of lactim. Thus where

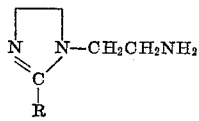

is reacted with O-methylcaprolactim the chief product is

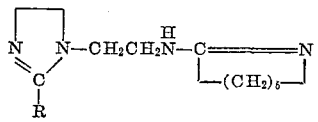

and a smaller amount of

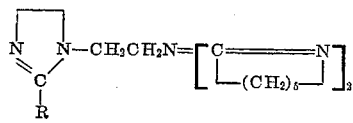

Where more than one equivalent of the lactim per labile cyclic amidine hydrogen is employed, an increased amount of the latter disubstituted compound is generally formed. In addition, shorter reaction times and lower temperature favor the monosubstituted products while higher temperatures and longer reaction times favor the disubstituted product.

In general, the reaction is carried out under such conditions under which the alcohol is distilled from the reaction mixture, and the measurement of the alcohol removed is an excellent method of judging reaction completion. A solvent or entraining agent may be employed, if desired. Although the temperature and time may vary widely depending on the particular reactants employed, one can advantageously employ temperatures of 100 to 250° C., but preferably 125 to 200° C. and times of 0.5 to 8 hours, but preferably 1 to 4. The reaction and product produced can be summarized by the following equation:

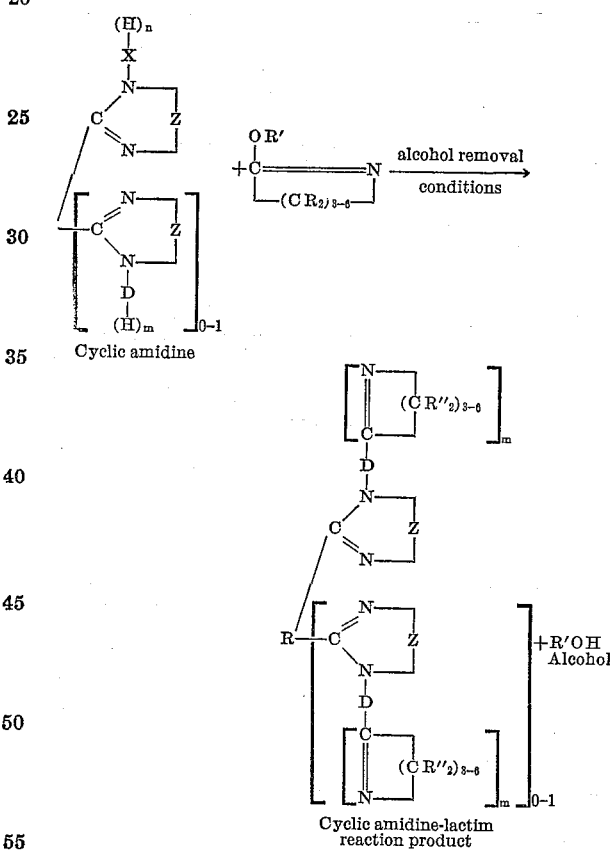

The meanings of the symbols designated in the above equation have the same meanings as stated above. The Z's, CR'''s, and D's may be the same or different. Thus one amidine ring may be a 5-member ring and the other a six-membered ring, one aza-alkylene may be a 6-member ring and the other a 5-member ring, and one D may be CH₂CH₂O— and the other CH₂CH₂N—, etc.

Specific examples of the cyclic-amidine-lactim reaction product comprise the reaction products of (1) the cyclic amidines of Tables I–IV, their oxygen and sulfur analogues and (2) the O-methyl and O-ethyl butyro-, valero-, capro- and heptylo-lactims.

EXAMPLES

In general, the compounds of this invention are prepared by reacting the cyclic amidine with the O-methyl lactim at a temperature of 150–200° C. for about 1–4 hours or until no more alcohol is given off. The products are purified by distillation under reduced pressure.

Example I

One mole of

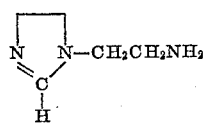

and one mole of

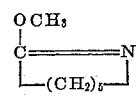

are reacted at 160° C.–185° C. in a flask attached to a Dean-Stark water trap until alcohol ceased distilling over (about 2 hours). The viscous product is then purified by distillation at 215° C. at 0.25 mm. to yield a product which is a viscous liquid which analyzed for 27.5% nitrogen (calculated 26.92%). The product is

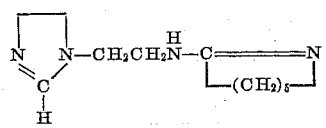

In addition, a small amount of the disubstituted product

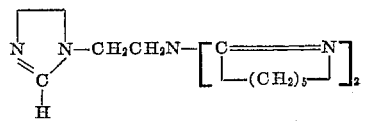

is also formed.

In order to save repetitious detail, the results of reactions carried out employing the homologues series imidazolines is presented in the following Table V.

Table V

| Ex. | R | Percent Nitrogen | | Distillation of Product | |
|---|---|---|---|---|---|
| | | Calc'd. | found | Pressure (mm.) | Temperature, °C. |
| 1 | H | 26.91 | 27.50 | 0.25 | 215 |
| 2 | $CH_3$ | 25.23 | 24.60 | 0.27 | 245 |
| 3 | $C_2H_5$ | 23.31 | 23.35 | 0.20 | 211 |
| 4 | $C_3H_7$ | 22.40 | 22.25 | 0.15 | 242 |
| 5 | $C_5H_{11}$ | 20.15 | 19.25 | 0.40 | 314 |
| 6 | $C_6H_{13}$ | 19.17 | 18.63 | 0.68 | 240 |
| 7 | $C_7H_{15}$ | 18.30 | 18.25 | 0.30 | 233 |
| 8 | $C_8H_{17}$ | 17.50 | 17.15 | 0.35 | 243 |
| 9 | $C_9H_{19}$ | 16.77 | 16.67 | 0.27 | 258 |
| 10 | $C_{11}H_{23}$ | 15.47 | 15.59 | 0.30 | 218 |
| 11 | $C_{13}H_{27}$ | 14.36 | 14.53 | 0.60 | 280 |
| 12 | $C_{15}H_{31}$ | 13.40 | 13.15 | 0.65 | 305 |
| 13 | $C_{17}H_{35}$ | 12.56 | 12.60 | 0.70 | 310 |

The products are viscous liquids with a tendency for the products to solidify on standing as the size of the R group increases. In addition, lesser amounts of the disubstituted products.

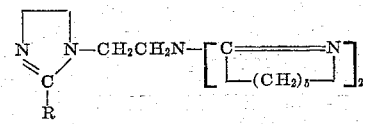

are also formed. In general, shorter reaction time and lower temperature favor the monosubstituted products while higher temperatures and longer reaction time favor the disubstituted compounds.

In addition to the homologues series of compounds shown in Table V, other compounds are similarly prepared in the manner shown in Example 1. Examples of these compounds are shown in the following table.

TABLE VI (Formula 1)

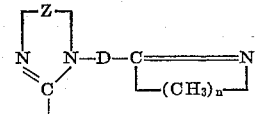

(Formula 2)

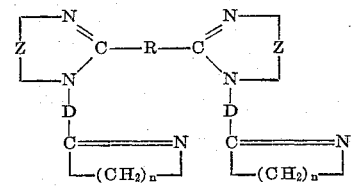

(Formula 3)

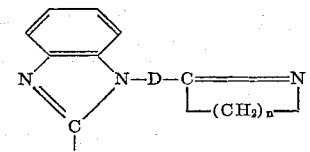

(Formula 4)

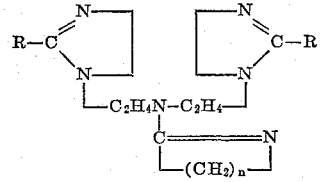

| Ex. | Formula | R | Z | D | n |
|---|---|---|---|---|---|
| 13 | (1) | $CH_3$ | $(CH_2)_2$ | | 5 |
| 14 | (1) | $C_2H_5$ | $(CH_2)_2$ | | 5 |
| 15 | (1) | $C_3H_7$ | $(CH_2)_2$ | | 5 |
| 16 | (1) | $CH_3$ | $(CH_2)_3$ | | 5 |
| 17 | (1) | $C_2H_5$ | $(CH_2)_3$ | $(CH_2)_2O$ | 5 |
| 18 | (1) | $C_3H_7$ | $(CH_2)_3$ | $(CH_2)_2O$ | 5 |
| 19 | (2) | $(CH_2)_4$ | $(CH_2)_2$ | $(CH_2)_2O$ | 6 |
| 20 | (2) | $(CH_2)_8$ | $(CH_2)_2$ | $(CH_2)_2NH$ | 6 |
| 21 | (2) | $(CH_2)_8$ | $(CH_2)_2$ | $(CH_2)_2NH$ | 5 |
| 22 | (2) | $(CH_2)_5$ | $(CH_2)_2$ | $(CH_2)_2NH$ | 5 |
| 23 | (3) | $CH_3$ | | | 5 |
| 24 | (3) | $C_{12}H_{15}$ | | | 5 |
| 25 | (3) | ⌬ (phenyl) | | | 5 |
| 26 | (4) | $C_5H_{11}$ | | | 5 |
| 27 | (4) | $C_{17}H_{35}$ | | | 5 |
| 28 | (1) | $C_{17}H_{35}$ | $(CH_2)_2$ | $(CH_2)_3S$ | 5 |
| 29 | (1) | $(CH_2)_4$ | $(CH_2)_2$ | $(CH_2)_3S$ | 5 |

USE AS CORROSION INHIBITOR

More specifically, this phase of the invention relates to the inhibition of corrosion in the petroleum industry with specific reference to producing wells, pipe lines, refineries, tank storage, etc.

The use of a corrosion inhibiting agent in the oil industry and other industries, and particularly for the protection of ferrous metals, is well known. For example, see U.S. Patents Nos. 2,736,658, dated February 28, 1954, to Pfohl et al., and 2,756,211, dated July 24, 1956, to Jones, and 2,727,003, dated December 13, 1955, to Hughes.

More specifically then, and particularly from the standpoint of oil production, this aspect of the invention relates to inhibiting corrosion caused by hydrogen sulfide, carbon dioxide, inorganic acids, organic acids, combinations of each with oxygen, and with each other and oxygen. More particularly, it relates to treating wells to mitigate metal corrosion and associated difficulties.

It should also be pointed out that the corrosiveness of oil well brines will vary from well to well, and the proportion of corrosion inhibiting agent added to the well fluids should also be varied from well to well. Thus, in some wells it may be possible to effectively control corrosion by the addition of as little as 5 p.p.m. of my new compositions to the well fluids, whereas in other wells, it may be necessary to add 200 p.p.m. or more.

In using my improved compositions for protecting oil well tubing, casing and other equipment which comes in contact with the corrosive oil-brine production, I find that excellent results are obtained by injecting an appropriate quantity of a selected composition into a producing well so that it mingles with the oil-brine mixture and comes into contact with the casing, tubing, pumps and other producing equipment. I may, for example, introduce the inhibiting composition into the top of the casing, thus causing it to flow down into the well and thence back through the tubing, etc. In general, I have found that this procedure suffices to inhibit corrosion throughout the entire system of production, and collection, even including field tankage.

In case serious emulsion or gel problems are encountered, demulsifiers are advantageously added. This is important not only to avoid the troublesome emulsions and gels themselves, but also to improve corrosion inhibition. The explanation of less effective corrosion inhibition in the presence of emulsions apparently is that the inhibitor is somewhat surface-active. That is, it is concentrated at interfacial surfaces. Since this surface is great in an emulsion, most of the inhibitor will be concentrated in these interfaces and little will remain in the body of the oil for deposition on the metal surfaces. In many wells, oil-in-water type emulsions often occur naturally. In such wells the inhibitors herein described tending to form water-in-oil type emulsions, often decrease the emulsion problems naturally present. Thus, in addition to being effective corrosion inhibitors, the herein described products tend to eliminate emulsion problems which sometimes appear when some of the present day inhibitors are used in oil wells or refinery processing.

The method of carrying out our process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, inorganic, organic acids, $O_2$ and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all well-head fittings, connections and flow lines handling the corrosive fluid.

Where the inhibitor composition is a liquid, it is conventionally fed into the well annulus by means of a motor driven chemical injector pump, or it may be dumped periodically (e.g., once every day or two) into the annulus by means of a so-called "boll weevil" device or similar arrangement. Where the inhibitor is a solid, it is dropped into the well as a solid lump or stick, blown in as a powder with gas, or it may be washed in with a small stream of the well fluids or other liquid. Where there is a gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. This results, for example, when the tubing is surrounded at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent, such as mineral oil, methylethyl ketone, xylene, kerosine, or even water. The selection of solvent will depend much upon the exact reagent being used and its solubility characteristics. It is also generally desirable to employ a solvent which will yield a solution of low freezing point, so as to obviate the necessity of heating the solution and injection equipment during winter use.

For treating wells with packed-off tubing, the use of solid "sticks" or plugs of inhibitor is especially convenient. These are prepared by blending the inhibitor with a mineral wax, asphalt or resin in a proportion sufficient to give a moderately hard and high-melting solid which can be handled and fed into the well conveniently.

The amount of corrosion preventive agent required in our process varies with the corrosiveness of the system, but where a continuous or semi-continuous treating procedure is carried out as described above, the addition of reagent in the proportion of from 5 parts per million to 1000 parts per million or more parts of corrosive fluid will generally provide protection.

These corrosion inhibitors can be used in combination with other well-known corrosion inhibitors, for example, the cyclic amidine structures, the amido cyclic amidine structures, and the amino cyclic amidine structures, as disclosed in the Blair and Gross Reissue Patent No. 23,227. When the herein described products are mixed with corrosion inhibitors of the conventional type in the ratio of one-to-three, one-to-one, three-to-one, or the like, in numerous instances the effectiveness of the corrosion inhibitors thus obtained is often significantly greater than the use of either one alone.

Since these products are basic they can be combined with various acids to produce salts in which oil solubility is increased or decreased. Likewise, water solubility is increased or decreased. For instance, the products are mixed with one or more moles of an acid, such as higher fatty acids, dimerized fatty acids, naphthenic acids, acids obtained by the oxidation of hydrocarbons, as well as sulfonic acids such as dodecylbenzene sulfonic acid, petroleum mahogany acids, petroleum green acids, etc.

What has been said in regard to the acids which increase oil solubility and decrease water solubility applies with equal force and effect to acids of the type, such as acetic acid, hydroxyacetic acid, gluconic acid, etc., all of which obviously introduce hydrophile character when they form salts or complexes, if complexes are formed. In addition, any of the acids described above in preparing the cyclic amidines are useful in preparing these salts.

As pointed out previously, the addition of corrosion inhibitors, particularly in the form of a solution by means of a metering pump or the like, is common practice. The particular corrosion inhibitors herein described are applied in the same manner as other corrosion inhibitors intended for use for the same purpose. For sake of brevity, as to the use of the corrosion inhibitor may be mentioned its solution and use in a suitable solvent such as mineral oil, methyl ethyl ketone, xylene, kerosene, high boiling aromatic solvent, or even water.

The following examples are presented to illustrate the superiority of the instant compounds as corrosion inhibitors.

*Static weight loss tests.*—These tests can be run on both synthetic and naturally occurring fluids. The test procedure involves the measurement of the corrosive action of the fluids inhibited by the compositions herein described upon sandblasted S.A.E. 1020 steel coupons measuring ⅞ x 3¼ inches under conditions approximating those found in an actual producing well, and the comparison thereof with results obtained by subjecting identical test coupons to the corrosive action of identical fluids containing no inhibitor.

In the present test clean pint bottles are charged with 200 ml. of 10% sodium chloride solution saturated with hydrogen sulfate and 200 ml. of mineral spirits. The solution is adjusted to pH 6.5 with acetic acid and a redox of −360 by means of ammonium sulfide. A predetermined amount of inhibitor is then added. In all cases the inhibitor concentration is based on the total volume of fluid. Weighed coupons are then added, the bottles tightly sealed and allowed to remain at room temperature for 5 days. The coupons are then removed, cleaned by immersion in inhibited 10% hydrochloric acid, dried and weighed.

The changes in the weight of the coupons during the corrosion test are taken as a measurement of the effectiveness of the inhibitor compositions. Protection percentage is calculated for each test coupon taken from the inhibited fluids in accordance with the following formula $$\frac{L_1 - L_2}{L_1} \times 100 = \text{percent protection}$$

in which $L_1$ is the loss in weight of the coupons taken from uninhibited fluids and $L_2$ is the loss in weight of coupons which were subjected to the inhibited fluids. These results are presented in the following table:

*Table VII*

STATIC WEIGHT LOSS TEST (150 P.P.M.)

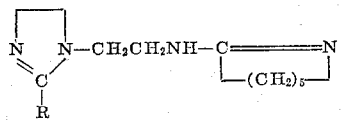

| Test | R | Av. Wt. Loss (mg.) | Percent Protection |
|---|---|---|---|
| 1 | No inhibitor | 153.5 | |
| 2 | H | 29.4 | 80.8 |
| 3 | CH₃ | 23.4, 21.7 | 84.8, 85.9 |
| 4 | C₂H₅ | 29.4 | 80.8 |
| 5 | C₃H₇ | 29.4 | 80.8 |
| 6 | C₅H₁₁ | 23.8 | 83.7 |
| 7 | C₇H₁₅ | 20.5 | 89.7 |
| 8 | C₈H₁₇ | 10.4 | 93.0 |
| 9 | C₉H₁₉ | 11.0 | 92.7 |
| 10 | C₁₁H₂₃ | 23.4 | 84.8 |
| 11 | C₁₃H₂₇ | 36.0 | 76.5 |
| 12 | C₁₅H₃₁ | 33.5 | 79.5 |
| 13 | C₁₇H₃₅ | 41.4 | 73.0 |

OTHER USES

These products are effective not only as corrosion inhibitors but can be used for a number of other purposes. For instance, they can be used as asphalt additives to increase the adhesiveness of the asphalt to the mineral aggregates. In the form of water soluble salts, for example, the acetate, hydroxyacetate, lactate, gluconate, phthalate, etc., they are useful as bactericides in the secondary recovery of oil. They can be subjected to extensive oxyalkylation by means of ethylene oxide, propylene oxide, butylene oxide, octylene oxide, or the like. These can be oxyalkylated and still have oil solubility as, for example, by the addition of propylene oxide or butylene oxide, or are oxyalkylated to produce water solubility as, for example, by means of ethylene oxide or glycide. They are also oxyalkylated by combinations of propylene oxide and ethylene oxide so that both water solubility and oil solubility remain. Thereupon they may, if desired, be acylated. Such products are useful for a variety of purposes and particularly for those where non-ionic surfactants or sequestered cationic surfactants are indicated.

These compounds and their derivatives unexpectedly have a broad spectrum of uses and can be used, for example, as demulsifiers for oil-in-water emulsions; as corrosion inhibitors; as fuel oil additives for gasoline, diesel fuel, jet fuel, and the like; as lubricating oil additives, as scale preventatives; as chelating agents or to form chelates which are themselves useful, for example, as anti oxidants, fungicides, etc.; as flotation agents, for example, as flotation collection agents; as asphalt additives or anti-stripping agents for asphalt-mineral aggregate compositions; as additives for compositions useful in acidizing calcareous strata of oil wells; as additives for treating water used in the secondary recovery of oil and in disposal wells; as additives used in treating oil-well strata in primary oil recovery to enhance the flow of oil; as emulsifiers for both oil-in-water and water-in-oil emulsions; as additives for slushing oils; as additives for cutting oils; as additives for oil to prevent emulsification during transport; as additives for drilling muds; as agents useful in removing mud sheaths from newly drilled wells; as de-hazing or "fog-inhibiting" agents for fuels; as additives for preparing sand or mineral slurries useful in treating oil wells to enhance the recovery of oil; as agents for producing polymeric emulsions useful in preparing water-vapor impermeable paper board; as agents in paraffin solvents; as agents in preparing thickened silica aerogel lubricants; as gasoline anti-oxidant additives; as deicing agents for fuels; as antiseptic, preservative, bactericidal, bacteriostatic, germicidal, fungicidal agents; as agents for the textile industry, for example, as mercerizing assistants, as wetting agents, as rewetting agents, as dispersing agents, as detergents, as penetrating agents, as softening agents; as dyeing assistants, as additives for rubber latices; as an entraining agent for concrete and cements; as anti-static agents for rugs, floors, upholstery, plastic and wax polishes, textiles, etc., as detergents useful in metal cleaners, in floor oils, in dry cleaning, in general cleaning, and the like; as agents useful in leather processes such as in flat liquoring, pickling, acid degreasing, dye fixing, and the like; as agents in metal pickling; as additives in paints for improved adhesion of primers, in preventing water-spotting in lacquer; as anti-skinners, for pigment flushing, grinding and dispersing; as antifeathering agents in ink; as agents in the preparation of pulp and pulp slurries; as emulsifiers for insecticidal compositions and agricultural sprays such as DDT, 24–D (Toxaphene), Chlordane, nicotine sulfate, hexachloracyclohexane, and the like; as agents useful in building materials, for example, in the water repellent treatment of plaster, concrete, cement, roofing materials, floor sealers; as additives in bonding agents for various insulating building materials; and the like.

I claim:
1. A compound of the formula

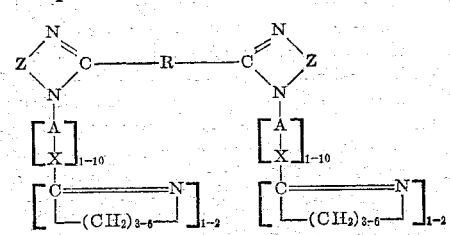

where Z is selected from the group consisting of (1) (CB₂)₂₋₃ and B is selected from the group consisting of hydrogen and lower alkyl and (2)

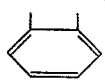

A is lower alkylene; X is selected from the group consisting of O, S, N, NH; and R is hydrocarbon having 1–36 carbon atoms.

2. A compound of the formula

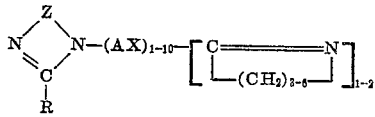

where Z is selected from the group consisting of (1) (CB₂)₂₋₃ and B is selected from the group consisting of hydrogen and lower alkyl and (2)

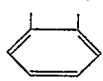

A is lower alkylene; X is selected from the group consisting of O, S, N, NH; and R is hydrocarbon having 1–36 carbon atoms.

3. A compound of the formula

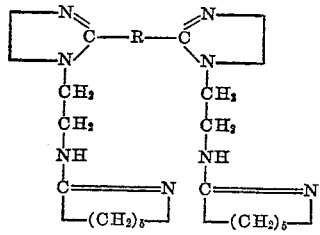

where R is hydrocarbon having 1–36 carbon atoms.

4. A compound of the formula

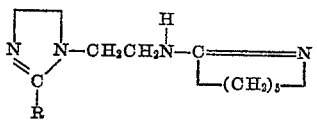

where R is hydrocarbon having 1–36 carbon atoms.

5. A compound of the formula

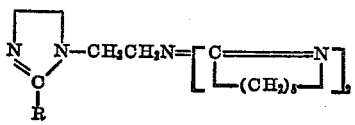

where R is hydrocarbon having 1–36 carbon atoms.

6. A compound of the formula

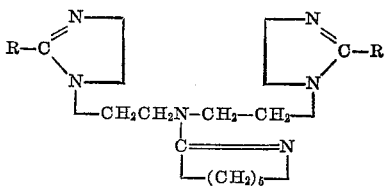

where R is hydrocarbon having 1–36 carbon atoms.

7. A compound of the formula

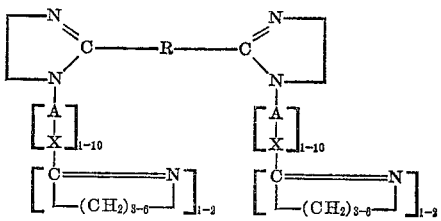

where A is lower alkylene; X is selected from the group consisting of O, S, N, NH; and R is hydrocarbon having 1–36 atoms.

8. A compound of the formula

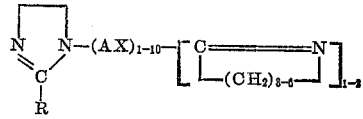

where A is lower alkylene; X is selected from the group consisting of O, S, N, NH; and R is hydrocarbon having 1–36 carbon atoms.

References Cited in the file of this patent

UNITED STATES PATENTS

| | | |
|---|---|---|
| 2,468,163 | Blair et al. | Apr. 26, 1949 |
| 2,640,029 | Blair et al. | May 26, 1953 |
| 2,713,582 | Smith | July 19, 1955 |
| 2,819,284 | Shen | Jan. 7, 1958 |

OTHER REFERENCES

Hager et al.: Chem. Abstracts, vol. 50, col. 5643 (1956).